(12) United States Patent
Wong et al.

(10) Patent No.: US 10,873,188 B2
(45) Date of Patent: Dec. 22, 2020

(54) DYNAMIC HOSTING CAPACITY SYSTEM AND METHOD FOR DER INTEGRATION AND MANAGEMENT ON DISTRIBUTION UTILITY NETWORKS

(71) Applicant: Opus One Solutions Energy Corporation, Richmond Hill (CA)

(72) Inventors: Joshua Wong, Toronto (CA); Gerhard Walker, Melrose, MA (US)

(73) Assignee: Opus One Solutions Energy Corporation, Toronto (CA)

( * ) Notice: Subject to any disclaimer, the term of this patent is extended or adjusted under 35 U.S.C. 154(b) by 0 days.

(21) Appl. No.: 16/180,554

(22) Filed: Nov. 5, 2018

(65) Prior Publication Data
US 2019/0140455 A1 May 9, 2019

Related U.S. Application Data

(60) Provisional application No. 62/581,080, filed on Nov. 3, 2017.

(51) Int. Cl.
*H02J 3/46* (2006.01)
*H02J 3/38* (2006.01)
(Continued)

(52) U.S. Cl.
CPC ............... *H02J 3/46* (2013.01); *G06N 5/003* (2013.01); *G06N 7/005* (2013.01); *G06N 7/08* (2013.01);
(Continued)

(58) Field of Classification Search
CPC .......... G06N 5/003; G06N 7/005; G06N 7/08; G06Q 50/06; H02J 2003/003;
(Continued)

(56) References Cited

U.S. PATENT DOCUMENTS

2012/0323390 A1* 12/2012 Kobayasi ............ H02J 13/0017
700/295
2016/0048150 A1* 2/2016 Chiang ..................... G05F 1/66
700/295

(Continued)

*Primary Examiner* — Chad G Erdman
(74) *Attorney, Agent, or Firm* — Kurtz Firm, PLLC

(57) ABSTRACT

A distributed energy resource management system utilizes capacity on a distribution grid to host further distributed energy resource interconnections. In an embodiment, the system utilizes a data store including operational values associated with distributed electric resources on an electric power distribution network and a processor or processors coupled to the data store and in communication with the distributed electric resources. The computer processors are programmed, upon receiving one or more requests, to create 3-phase AC power flows for each location across the electric power distribution network. Optimizations of the 3-phase AC power flows to are used to calculate hosting capacity for each of the locations, for each of a plurality of time intervals, and each of a plurality of types of distributed energy resource, as a dynamic quantity that can change depending on time, day, season, and location. The hosting capacity is translated into calculated operational values which are used to determine and send a direction to actively manage distributed energy resources on the electric power distribution network.

27 Claims, 3 Drawing Sheets

(51) Int. Cl.
*G06Q 50/06* (2012.01)
*G06N 7/00* (2006.01)
*G06N 7/08* (2006.01)
*G06N 5/00* (2006.01)
*H02J 3/14* (2006.01)
*H02J 7/32* (2006.01)
*H02J 3/00* (2006.01)

(52) U.S. Cl.
CPC .............. *G06Q 50/06* (2013.01); *H02J 3/381* (2013.01); *H02J 3/003* (2020.01); *H02J 3/14* (2013.01); *H02J 7/32* (2013.01); *H02J 2203/20* (2020.01)

(58) Field of Classification Search
CPC ........ H02J 2003/007; H02J 3/14; H02J 3/381; H02J 3/46; H02J 7/32
See application file for complete search history.

(56) References Cited

U.S. PATENT DOCUMENTS

| | | | | |
|---|---|---|---|---|
| 2016/0363950 | A1* | 12/2016 | Friedrich | G05F 1/66 |
| 2017/0005515 | A1* | 1/2017 | Sanders | H02J 3/381 |
| 2018/0365746 | A1* | 12/2018 | Nasle | G06Q 30/0611 |
| 2019/0129368 | A1* | 5/2019 | Iacovella | G06Q 10/04 |
| 2019/0163152 | A1* | 5/2019 | Worrall | G06Q 50/06 |
| 2019/0181681 | A1* | 6/2019 | Okino | H02J 13/0006 |

* cited by examiner

DYNAMIC HOSTING CAPACITY SYSTEM AND METHOD FOR DER INTEGRATION AND MANAGEMENT ON DISTRIBUTION UTILITY NETWORKS

This application is a non-provisional of, and claims priority to, U.S. Provisional Patent Application No. 62/581,080 filed Nov. 3, 2017, the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

With state governments and Public Utility Commissions (PUCs) putting forward ambitious new plans for the integration of distributed energy resources (DERs) such as rooftop solar and behind-the-meter battery storage, electric distribution utilities are being called upon to present plans that will help them to integrate all DERs while maintaining reasonable system costs and incenting new DER investors or business models. In addition, declining costs and government incentives have caused the rate of DER development to accelerate in recent years.

One key metric in the interconnection process of DERs into distribution grids is the so-called hosting capacity which indicates the available capacity on a distribution grid to host further DER interconnections. Hosting capacity plays a vital role within any interconnection process as it determines if the utility will have to upgrade hardware components, and as such, how expensive the interconnection will be for the customer. However, to current date, hosting capacity is calculated as a static, worst case value. As a result, utilities typically do not look at locational differences of hosting capacity on a feeder and do not account for flexible assets to mitigate the impact on hosting capacity.

Utilities typically take a worst-case approach accounting for every scenario, no matter how unlikely.

While some solutions and publications have provided initial proposals for a more detailed and accurate view of hosting capacity by improving the level of granularity and differentiation between DERs, an essential component missing on current approaches is a view of hosting capacity as a dynamic quantity that can change depending on time, day, season, and location. Another essential component missing on current approaches is the ability to translate dynamic hosting capacity into an operational value that allows the integration of planning and operations. In this respect, an operational value may be a real time operational value or an operational value associated with planning, scheduling, or market pricing.

Problems associated with interconnecting DERs to the distribution grid are multi-fold and negatively affect several stakeholders. Utilities need to understand the impact of DERs on the distribution grid, want to be able to influence DER development, want to be able to control DERs on the grid in an optimal fashion, and need to reduce time and cost of interconnection requests (internally and for customer). The customer needs to reduce the risk of interconnection to his project, wants new business models that allow him to defer interconnection cost, needs insurance that a utility controlled DER still generates revenue, and wants to know where to interconnect best.

The high level, worst case, static approach to hosting capacity dramatically impacts strategic distribution system planning, resulting in static, one-time plans updated periodically which only represent a worst-case scenario.

Hosting capacity as it stands today severely limits a utility's ability to effectively interconnect, plan for, or make DER an attractive investment to both, rate payers and DER developers.

SUMMARY

Disclosed herein is a dynamic hosting capacity methodology and system for DER integration and management on distribution utility networks. An objective of the invention is to enable utilities to determine a dynamic hosting capacity value for each location on the distribution grid, each time interval, and each type of DER asset, and to provide active management of these assets, when calculating interconnection requests, planning distribution grids, and/or when actively managing all DERs connected to the distribution grid. Such active management may be accomplished by determining and sending commands to distributed energy resources on the electric power distribution network. Such active management may comprise providing direction in connection with real time active management of the DERs or providing active management in connection with planning, scheduling, or market pricing in connection with the DERs.

To achieve this objective, several key technologies can be provided based on a high-power grid analytics engine that includes real-time state estimation, scenario, and impact analysis (instead of pre-set limits, rules, and worst-case scenarios). Using only the utility network model, available sensor input, and information on the DERs under control, the dynamic hosting capacity module can discern the impact of individual DERs on a power system. With the benefit of topology processing, security-constrained AC optimal power flow, and stochastic and probabilistic analysis, the utility can now make a risk-based evaluation and decision to change interconnection and DER management. There are several benefits of the presently disclosed system for the various stakeholders. For DER developers and customers requesting DER Interconnection, the system can provide increased availability of hosting capacity allows for cheaper interconnection. The system can also provide such stakeholders with location resolved hosting capacity that allows for ideal determination of project location. Operational use of dynamic hosting capacity allows such stakeholders to provide new business models to make the interconnection even more cost-effective for users.

For distribution utilities, the presently disclosed system can provide a better understanding of the impact of DERs on distribution grids, an attractive solution to convince customers to allow active management by the utility, and a market-based dynamic hosting capacity that favors such developers.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

There are several limitations associated with previous hosting capacity calculations and their application. Typically, DER hosting capacity is calculated as a static worst-case quantity so that utilities can manage interconnection requests and plan for future grid investments. The problem with this approach is that it does not distinguish between different types of DERs—such as storage and solar—which can have profoundly different impacts on the grid. Furthermore, the ability to manage DERs not in operation during specific hours, via a DERMS, is not accounted for. As such, the worst-case approach leads utilities to making a limited amount of hosting capacity available. It is also limited to a static view of the grid, and does not consider the utility's ability to shift loads through demand response, topology switching, and current real-time variations, nor does it consider the impact of DERs by type, size, location, and contractual obligation. The worst-case approach makes interconnection processes more expensive for DERs than they need to be, as these assets must bear the cost of unnecessary grid upgrades. In summary:

a. Hosting capacity is calculated as a one-time fix value:
  i. This reduces the available capacity, as the grid section is judged by one-time slot rather than a time series of data which could show more capacity available during the rest of the day.
b. Hosting capacity is calculated under worst case assumptions:
  i. A worst-case assumption might show a grid condition that occurs once every year for 15 min. Limiting the capacity to this value results in a significant reduction of grid utilization and over-investment into traditional physical assets.
c. Hosting capacity is calculated assuming "dumb" or none smart DERs:
  i. As a result, any possible mitigating effects optimization of the DERs in terms of scheduling, dispatch, or curtailment might have is not considered.

Figure 1:
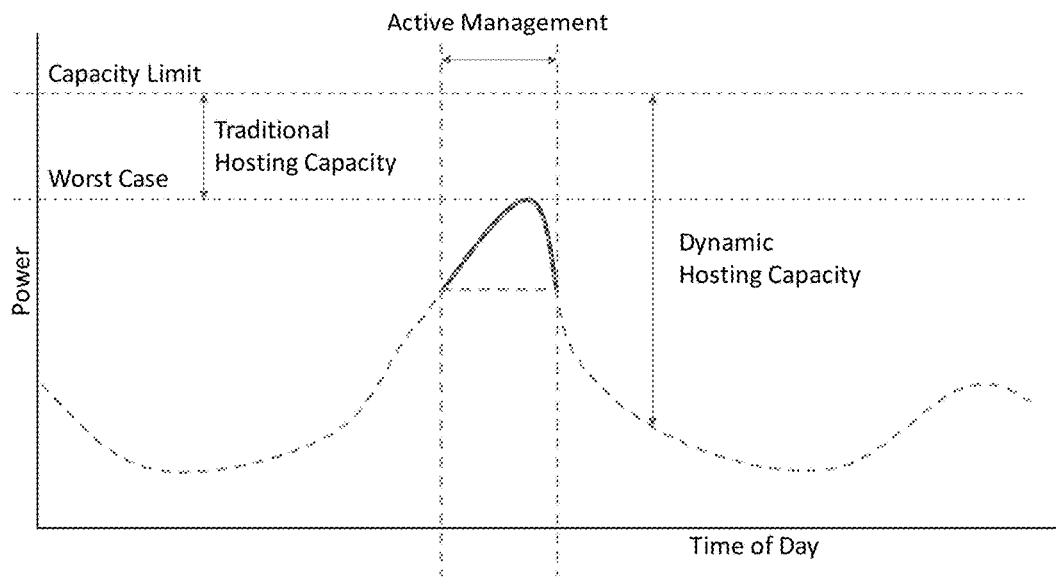
FIG. 1 shows a schematic illustrating hosting capacity vs. dynamic hosting capacity in accordance with an embodiment of the invention.

Furthermore, besides the problems in the approach to calculating hosting capacity, utilities currently lag the technology to bridge the gap between planning (where it originates) to operations or markets.

a. Hosting capacity is not used as an operational parameter for DER scheduling
b. Hosting capacity is not used as a market indicator to where DER investments are beneficial FIG. 1 shows a schematic of hosting capacity vs. dynamic hosting capacity and depicts a schematic view of the above issue. If utilities use the presently disclosed system and method to calculate the dynamic hosting capacity for each location in the grid and leverage it as an operational parameter as shown in FIG. 1, a minimal active management of DERs can drastically increase the overall available capacity with minimal DER impact.

To be able to calculate DHC a very detailed understanding of the distribution grid at a physical level is required. To achieve this, the system and method disclosed herein uses a real-time distribution system state estimation (DSSE) engine that enables DHC calculations to attain a full situational awareness across the distribution network, including values included in the creation of 3-phase AC optimal power flows. Such values include, per phase: voltages, currents, real power, reactive power, real loss, reactive losses, power factors, asset utilization, load duration curves, and potentially others.

This information is then used to calculate the hosting capacity at each node in the system
  a. Establishes specific node, feeder, and substation hosting capacity and capacity constraints
  b. Determine the impact of various DERs on that hosting capacity Process In an embodiment, the residual load capacity of the feeder or grid segment in question is calculated using historical data, forecast data, and real-time situational awareness data generated from full 3-phase AC unbalanced state estimation and power-flow functions. This residual capacity calculation only includes the non-flexible (or not DHC contracted) DERs, loads, and generators. The residual capacity for the feeder is made available as a probabilistic profile, showing for example the 5th and 95th percentile of expected residual capacity. However, the results are not limited to hosting capacity values as current constraints as they also reflect voltage levels, phase angles, and other limiting factors of grid operations. The DHC process then determines the maximum load and generation that can be accepted on the feeder during any given time of day by size, type, location, phase, and contract (operational and business models). These calculations are done with both real-time telemetry and forecasted data (as far out as the utility provides forecasted data).

Constraints for load and generation assets are then used to schedule (forecasted data) or manage (real-time data) DERs on the corresponding feeder or grid segment, so that they can influence each other's capacity availabilities. For example, a charging battery system during peak solar hours can increase the DHC for solar generation during that window. The hosting capacity itself can be distributed between the different aggregators and DERs.

Scheduling of DERs and optimization of hosting capacity is supported through a variety of physics-based analytics services that allow a DHC-enhanced DERMS to optimize DERs in a holistic manner:

a. Topology processing: Utilizing the underlying model of the distribution grid, impacts on hosting capacity through grid reconfiguration can be evaluated in real-time or forecasted
b. Network model manager: Manages the network models and ensures data points are assigned correctly and that models are power flow ready
c. Scenario analysis: By understanding the impacts of DERs by evaluating the grid model itself, a DHC-enhanced DERMS can predict impacts and changes to grid conditions prior to managing DERs, resulting in ideal setpoints
d. Distribution System State Estimation: Rather than making decisions based on single sensor data sets, full situational awareness is generated based on a 3-phase AC unbalanced power flow and becomes the foundation for optimization approaches
e. Multi-constraint and multi-agent optimization: Instead of relying on purely system-centric optimization approaches, optimization includes contractual constraints, DER needs and limitations (e.g., state of battery charge), and other customer-related aspects, resulting in a holistic, techno-economic optimum
f. Security-Constrained AC Optimal Power Flow: System optimization is handled based on a global optimum rather than pre-set rules. As such, a voltage constraint can be handled through a wide variety of approaches, all with different impacts on other grid parameters. Understanding these impacts and being able to optimize (e.g., for system losses, voltage levels, or current constraints) allows the most effective leveraging of hosting capacity
g. Stochastic and Probabilistic Engine: Allows the accountancy of variable resources by modelling uncertainties into the computations. As a result, users get confidence intervals which allow them to make risk-based decisions.
h. Quasi Static Time Series: Enables step-by-step time series computation to show progression of events and grid behavior.

Figure 2:
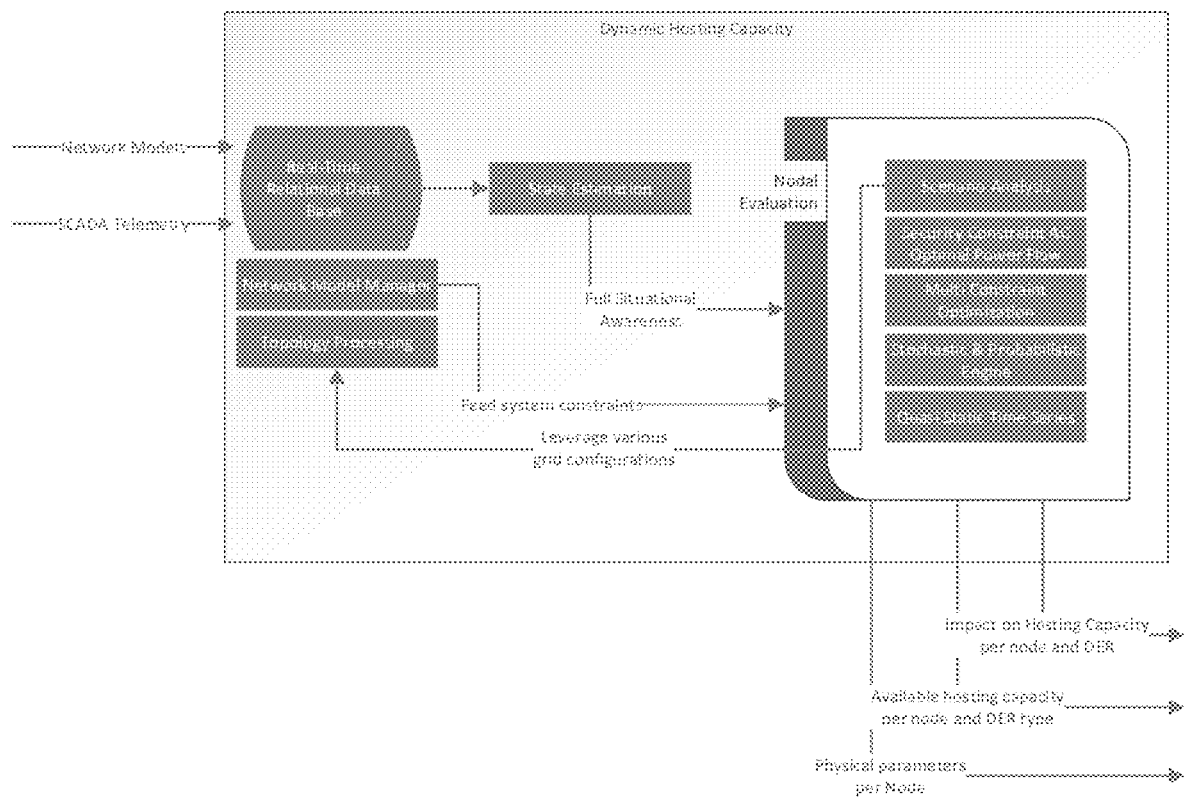
FIG. 2 shows a process diagram illustrating an overview of a dynamic hosting capacity process according to an embodiment of the invention.

FIG. 2 shows a process overview of DHC. This process described can be completed for times, be it with historic data, real-time data, or forecasted data, depending on the various use cases.

Use Case 1: Historic DHC

Figure 3:
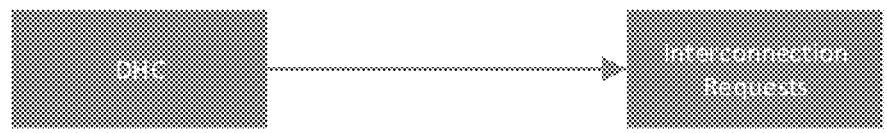
FIG. 3 shows a process diagram illustrating a first use case wherein a historic analysis is performed.

FIG. 3 shows an overview of Use Case 1. DHC, in the sense of a historic analysis can be used when a utility wants to understand their current (average) available hosting capacity over the extent of the last x-years. By utilizing historic SCADA (or other sensor) data in addition to network models (including topology changes) DHC can provide the hosting capacity of the observed time frame at the highest possible time resolution. This allows utilities to run an analysis on still available dynamic hosting capacity which can be utilized for interconnection requests.

Use Case 2: Real Time DHC and Constraint Management

Figure 4:
FIG. 4 shows a process diagram illustrating a second use case wherein dynamic hosting capacity is calculated during real time operations at every given time interval and for all grid levels.

FIG. 4 shows an overview of Use Case 2. The presently disclosed methods can be used to calculate a DHC during real time operations at every given time interval and for all grid levels. This real time DHC calculation serves multiple purposes and provides the utility a full situational awareness of all its hosting capacity constraints. This can be used to add leveraging of Scenario Analysis, Security Constraint Optimal Power Flow, and/or Multi-Constraint Optimization.

Within DHC, an optimal real-time DER dispatch can be achieved.

Use Case 3: Forecasted DHC

Figure 5:
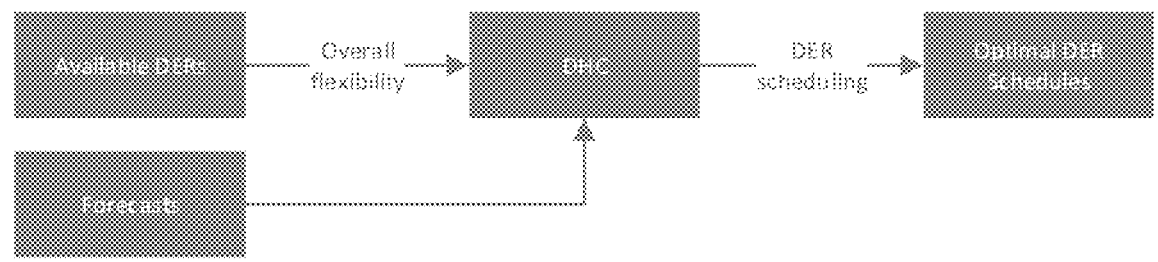
FIG. 5 shows a process diagram illustrating a third use case wherein dynamic hosting capacity is forecasted data for weather and load values are used to calculate dynamic hosting capacity.

FIG. 5 shows an overview of Use Case 3. Using forecasted data for weather and load values, the DHC is calculated at the given time interval for the operational planning horizon (e.g. 1 day ahead). This provides a continuously updated vision of the hosting capacity in the immediate future for every grid level. This information is then used during operational planning. By adding the stochastic and probabilistic module, DHC can determine a risk and value based DER schedule that ensures no constraints on the system with minimal impact on the DERs themselves.

Here, multi-objective/agent optimization is utilized to enable optimal DER dispatch within a given hosting capacity band to allow for minimal impact on DER operations, and optimal value of DERs to the grid. This approach takes into consideration technical and contractual limitations of DERs, such as state of charge or minimum required availability. By leveraging this ability, the option to control DERs allow utilities to move away from the worst-case planning scenario.

Through scenario analysis applications, a full "what if" understanding of DER impacts on hosting capacity can be achieved, allowing the DHC to optimize DER scheduling and unit commitment based on sensitivity-, scenario-, and physics-based analytics. This results in minimal impact on the DERs while retaining peak capacity reserves as defined by the utility. This also includes distribution automation (DA) functions, which the DHC incorporates in its CIM-native network topology manager, allowing for a clear and predictive understanding of grid reconfiguration actions on hosting capacity.

Use Case 4: DHC Markets

Figure 6:
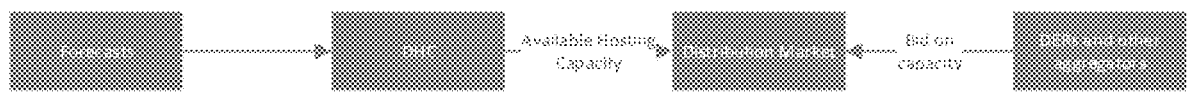
FIG. 6 shows a process diagram illustrating a fourth use case wherein forecasted available hosting capacity is used as an input to a distribution market.

FIG. 6 shows an overview of Use Case 4.

Using the forecasted DHC, a market can be generated around hosting capacity to optimize grid components, especially DERs. When calculating hosting capacity for operational planning purposes e.g. day ahead, at this stage, the optimization isn't achieved by a single entity with unilateral control over everything, but rather, the hosting capacity is marketed to each flexible asset or aggregator of assets on the grid. DERs and DR can then bid on the capacity to secure themselves their required portion considering weather and other forecasts. Aggregators can bid for their aggregation pool, optimizing within their assets.

Use Case 5: Integrated Distribution Planning

Figure 7:
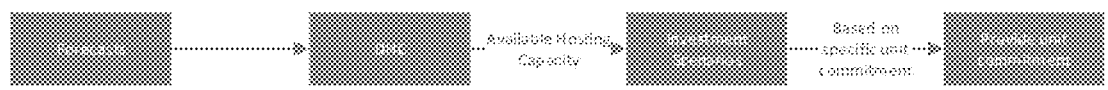
FIG. 7 shows a process diagram illustrating a fifth use case wherein dynamic hosting capacity is used for integrated distribution planning.

FIG. 7 shows an overview of Use Case 5. Using forecasts with time horizons up to 30 years out, DHC can be calculated for each study interval along, enabling utilities to quantify and evaluate potential investment scenarios (investment scenarios, hosting capacity upgrades, expansion strategies, and non-wires alternatives) based asset benefits, by type, capacity, location, and time.

Figure 8:
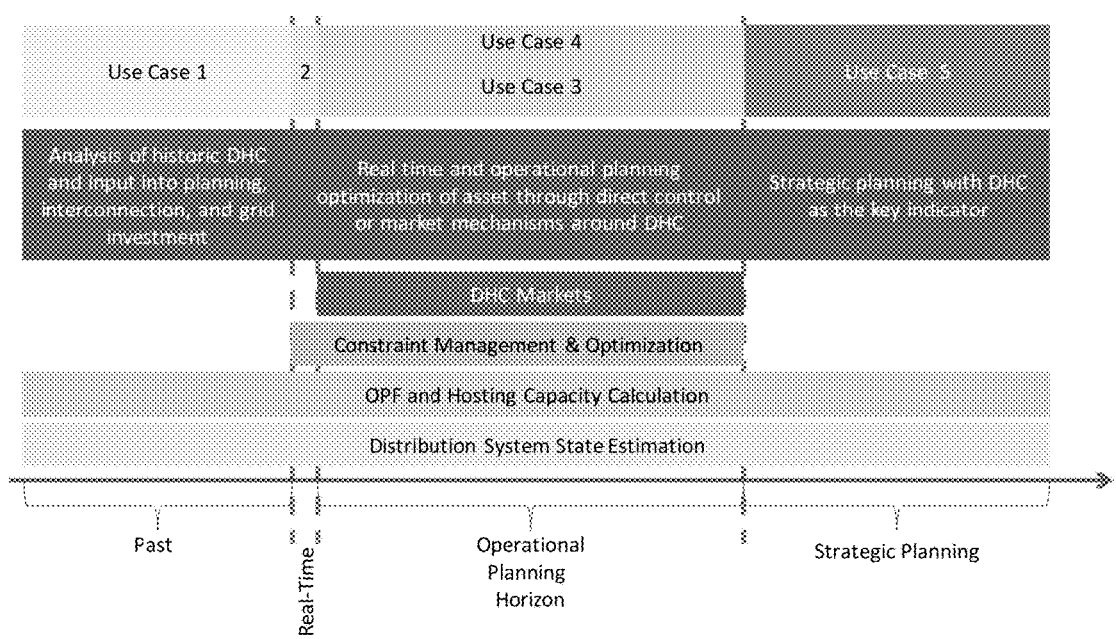
FIG. 8 shows a process diagram illustrating an overview of operation of a system that uses the above use cases.

FIG. 8 shows an overview of DHC Use Cases, and highlights how the described use cases fit together in the overall application of DHC.

In summary, DHC provides utilities with significantly greater visibility into available hosting capacity pertaining to location and time. This insight can be applied to interconnect, manage, and optimize different types of DERs depending on their DHC requirement profiles.

Examples of Novel Aspects of the Disclosed System and Method

DHC processes and systems as disclosed herein can provide several novel solutions and applications to address challenges facing utilities:
 a. Brings hosting capacity from a one time fixed and worst case assumption based value to a dynamic, location and time dependent, value that is different for each DER asset
 b. Utilizes a 3-phase AC unbalanced model that accounts for the unbalanced nature of the grid and quantifies the real and reactive components of grid behavior to calculate DHC for every node of the system.
 c. Creates accurate 3-phase security constraint AC optimal power flows for situational awareness across the distribution network including per phase at every asset level and every node on the bus across the distribution network
 d. Leverages scenario analysis to determine impact of DERs on hosting capacity levels at every level of the distribution grid
 e. Uses multi constraint optimization to ensure that DER scheduling takes all constraints into consideration, such as contractual limitations, state of charge, or other, asset specific limits.
 f. Leverage probabilistic and stochastic capabilities to enable sophisticated analyses around uncertainties and portfolio risk management.

DHC can be used as an interconnection mechanism to reduce the interconnection cost for DER developers by allowing them to connect at e.g. 70% rated power and linking them to the DHC platform. The DHC platform would then ensure, that whenever constraints occur the DER is curtailed to 70% to mitigate those constraints.

Of course, DERs must be given certain contractual guarantees by the utility (such as caps on optimization) to prevent selective discrimination against assets based on optimization outcomes. This can be achieved through providing the DER with:
 a. Minimum average up time
 b. Maximum curtailment
 c. Maximum impact on yearly revenue
 d. Compensation mechanisms for control over DERs The system and method described above can enable utilities to determine a dynamic hosting capacity value for each location on the distribution grid, each time interval, and each type of DER asset, and to provide active management of these assets, when responding to interconnection requests, planning distribution grids, and/or when actively managing all DERs connected to the distribution grid. Such active management may be accomplished by determining and sending commands to distributed energy resources on the electric power distribution network.

The present invention is described above with reference to block diagrams and operational illustrations of methods and devices. It is understood that each block of the block diagrams or operational illustrations, and combinations of blocks in the block diagrams or operational illustrations, may be implemented by means of analog or digital hardware and computer program instructions. These computer program instructions may be stored on computer-readable media and provided to a processor of a special-purpose computer, general-purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

At least some aspects disclosed can be embodied, at least in part, in software. That is, the techniques may be carried out in a special-purpose or general-purpose computer system or other data processing system in response to its processor, such as a microprocessor, executing sequences of instructions contained in a memory, such as ROM, volatile RAM, non-volatile memory, cache or a remote storage device. Functions expressed herein may be performed by a processor in combination with memory storing code and should not be interpreted as means-plus-function limitations.

Routines executed to implement the embodiments may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine-readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques disclosed above. Thus, the techniques are neither limited to any specific combination of hardware circuitry and software nor to any particular source for the instructions executed by the data processing system.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention. For example, elements and/or steps described herein in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

What is claimed is:

1. A distributed energy resource management system that utilizes capacity on a distribution grid to host further distributed energy resource interconnections, comprising:
   a) a data store including a plurality of operational values associated with a plurality of distributed electric resources on an electric power distribution network; and
   b) one or more computer processors coupled to the data store and in communication with the plurality of distributed electric resources on said electric power distribution network, the one or more computer processors being programmed, upon receiving one or more requests, to:
      i) create 3-phase AC power flows for each of a plurality of locations across said electric power distribution network, wherein said step of creating 3-phase AC power flows utilizes per phase: voltages, currents, real power, reactive power, and, power factor; and,
      ii) use optimizations of the 3-phase AC power flows to calculate hosting capacity for each of the plurality of locations across said electric power distribution network, for each of a plurality of time intervals, and each of a plurality of types of distributed energy resource, as a dynamic quantity that can change depending on time, day, season, and location;
      iii) translate the calculated dynamic hosting capacity into at least one calculated operational value;
      iv) store said at least one calculated operational value in the data store; and
      v) read said calculated operational value from the data store and use the calculated operational value to determine and send a direction to actively manage a plurality of distributed energy resources on said electric power distribution network.

2. The distributed energy resource management system according to claim 1, wherein said step of creating 3-phase AC power flows utilizes per phase: real loss, reactive losses, asset utilization, and load duration curves.

3. The distributed energy resource management system according to claim 1, wherein said hosting capacity comprises hosting capacity of a feeder on the electric power distribution network.

4. The distributed energy resource management system according to claim 1, wherein said hosting capacity comprises hosting capacity of a substation on the electric power distribution network.

5. The distributed energy resource management system according to claim 1, wherein said data store receives and stores sensor telemetry, and wherein said processor configured to create 3-phase AC power flows comprises a processor configured to use sensor telemetry to create said 3-phase AC power flows.

6. The distributed energy resource management system according to claim 5, wherein said data store further receives and stores a utility network model, and wherein said processor configured to create 3-phase AC power flows comprises a processor configured to use said sensor telemetry and said utility network model to create said 3-phase AC power flows.

7. The distributed energy resource management system according to claim 5, wherein said sensor telemetry comprises SCADA telemetry.

8. The distributed energy resource management system according to claim 1, wherein said hosting capacity comprises hosting capacity of a node on the electric power distribution network.

9. The distributed energy resource management system according to claim 1, wherein said step of determining and sending direction comprises sending commands to said distributed energy resources in response to an interconnection request from a specific distributed electric resource.

10. The distributed energy resource management system according to claim 1, wherein said data store comprises a real-time relational database.

11. The distributed energy resource management system according to claim 1, wherein said processor configured to create 3-phase AC power flows comprises a processor configured to use a real-time distribution system state estimation engine.

12. The distributed energy resource management system according to claim 1, wherein said step of using the 3-phase AC power flow to calculate hosting capacity comprises performing a scenario analysis.

13. The distributed energy resource management system according to claim 1, wherein said step of using the 3-phase AC power flow to calculate hosting capacity comprises calculating a security constraint AC Power Flow.

14. The distributed energy resource management system according to claim 1, wherein said step of using the 3-phase AC power flow to calculate hosting capacity comprises performing a multi-constraint optimization.

15. The distributed energy resource management system according to claim 1, wherein said step of using the 3-phase AC power flow to calculate hosting capacity comprises using the 3-phase AC power flow in a stochastic and probabilistic engine.

16. The distributed energy resource management system according to claim 1, wherein said step of using the 3-phase AC power flow to calculate hosting capacity comprises using the 3-phase AC power flow in a quasi-static time series.

17. The distributed energy resource management system according to claim 1, wherein said calculated dynamic hosting capacity comprises available hosting capacity per node.

18. The distributed energy resource management system according to claim 1, wherein said calculated dynamic hosting capacity comprises available hosting capacity per node and distributed electric resource type.

19. The distributed energy resource management system according to claim 1, wherein said calculated dynamic hosting capacity comprises available hosting capacity for each of a plurality of time intervals.

20. The distributed energy resource management system according to claim 1, wherein said calculated dynamic hosting capacity comprises available hosting capacity for each location on the distribution grid, each of a plurality of time intervals, and each of a plurality of types of distributed electric resource asset.

21. The distributed energy resource management system according to claim 1, wherein said calculated dynamic hosting capacity comprises a location resolved hosting capacity.

22. The distributed energy resource management system according to claim 1, further comprising a step of using the calculated dynamic hosting capacity to determine a schedule for dispatch of distributed energy resources on the electric power distribution network.

23. The distributed energy resource management system according to claim 1, wherein the step of calculating hosting capacity comprises calculating residual load capacity of a feeder or grid segment using historical data.

24. The distributed energy resource management system according to claim 1, wherein the step of calculating hosting capacity comprises calculating residual load capacity of a feeder or grid segment using forecast data.

25. The distributed energy resource management system according to claim 1, wherein said step of calculating hosting capacity comprises calculating residual load capacity of a feeder or grid segment using real-time situational awareness data.

26. The distributed energy resource management system according to claim 1, wherein said calculated dynamic hosting capacity comprises available hosting capacity per phase and distributed electric resource type.

27. The distributed energy resource management system according to claim 1, wherein said 3-phase AC power flows comprise 3-phase AC optimal power flows.

\* \* \* \* \*